United States Patent [19]

Mastak

[11] Patent Number: 5,074,744
[45] Date of Patent: Dec. 24, 1991

[54] APPARATUS FOR ARTICLE HANDLING
[75] Inventor: Ned Mastak, Tavares, Fla.
[73] Assignee: Simplimatic Engineering Company, Lynchburg, Va.
[21] Appl. No.: 579,186
[22] Filed: Sep. 5, 1990

Related U.S. Application Data

[63] Continuation of Ser. No. 358,820, May 30, 1989, abandoned.

[51] Int. Cl.⁵ .............................................. B65G 57/22
[52] U.S. Cl. ............................ 414/791.7; 414/794.7; 198/419.1
[58] Field of Search ............... 414/799, 791.7, 791.6, 414/794.7, 786; 198/434, 419.1

[56] References Cited

U.S. PATENT DOCUMENTS

| | | |
|---|---|---|
| 2,858,009 | 10/1958 | Bainbridge . |
| 2,949,179 | 8/1960 | Busse ............................ 414/791.7 X |
| 3,027,020 | 3/1962 | McCoy . |
| 3,219,203 | 11/1965 | Jeremiah . |
| 3,389,810 | 6/1968 | Wolfe et al. . |
| 3,493,126 | 2/1970 | Forshier et al. . |
| 3,570,685 | 3/1971 | Carlson . |
| 3,612,299 | 10/1971 | Shaw . |
| 3,788,497 | 1/1974 | Carlson ....................... 414/794.7 X |
| 3,865,258 | 2/1975 | Müller ............................. 414/788.8 |
| 3,934,713 | 1/1976 | Van der Meer et al. . |
| 3,978,970 | 9/1976 | Reimers .............................. 198/425 |
| 4,162,016 | 7/1979 | Schmitt ....................... 414/794.7 X |
| 4,759,673 | 7/1988 | Pearce et al. ............... 414/793.8 X |

FOREIGN PATENT DOCUMENTS 2145687 4/1985 United Kingdom ............. 414/791.7

Primary Examiner—David A. Bucci
Assistant Examiner—William M. Hienz
Attorney, Agent, or Firm—St. Onge, Steward, Johnston & Reens

[57] ABSTRACT

An article handling apparatus is provided for arranging a mass of randomly supplied articles into a group and moving the group from a group arranging area to a group loading area. The apparatus comprises retractable pattern forming pins closable to halt article movement while a group is being arranged and openable to permit article movement after a group has been arranged. The path forming pins are also closable during travel of the moving device back from the loading area to the arranging area to permit arrangement of a next successive group during said travel.

18 Claims, 6 Drawing Sheets

APPARATUS FOR ARTICLE HANDLING

This is a continuation of copending application Ser. No. 07/358,820, filed on May 30, 1989, now abandoned.

I. FIELD OF THE INVENTION

The present invention relates to an article handling apparatus such as a palletizer. More specifically, in one preferred embodiment an improved article palletizer is provided wherein palletizer speed is improved by permitting a next subsequent group of articles to enter a pattern forming area while an article sweep is returning to an initial position after having first deposited a previous group of articles on a pallet.

II. BACKGROUND OF THE INVENTION

Article handling equipment known as palletizers are well known in the art. Palletizers receive randomly oriented articles, such as for example beverage containers in bulk onto a pattern forming area; form said articles into a patterned group or layer usually having adjacent longitudinal rows staggered with respect to each other to achieve an efficient packing factor; and sweep successively formed layers in succession onto a pallet positioned further downstream on a hoist. After each layer is swept from the pattern forming area onto the pallet, a separator sheet such as chipboard is placed over the layer, and the hoist is lowered incrementally to a position for receiving the next subsequent layer on top of the separator sheet. The cycle of pattern forming, sweeping onto the pallet, separator sheet placement, and pallet lowering is carried out until the pallet is loaded to include a preselected number of layers.

In one prior art type device, randomly supplied articles accumulate on a conveyor driven accumulator area, the output of which is gated by raising and lowering a set of holding pins. Articles are gated from said accumulation area into a carriage, which comprises a generally rectangular frame member mounted on longitudinally extending rods. The carriage moves back and forth in a cyclical fashion for transporting patterned layers or groups one at a time to a pallet. The carriage frame has a pattern former fixedly attached to a front retaining cross member, the pattern former being formed from a plurality of vertically extending pins welded to the pattern former, with alternate ones of said pins being offset from one another transversely for forming pockets that stagger the front transverse row of articles as articles are admitted thereto and urged thereagainst by line pressure. When a full group is in said carriage, a set of carriage pins mounted towards the rear of the carriage descends to engage and separate the group, as the carriage moves downstream to sweep the layer from the pattern forming area onto the pallet. After the sweeping operation the carriage moves back to its initial position and, when so repositioned, the holding pins and carriage pins are raised to allow the next subsequent group of articles to enter. Because the carriage must return to its initial position before admitting the next group, time is thereby consumed in a nonproductive manner because the flow of articles from the accumulation area to the pallet is disrupted for a significant time interval each cycle in waiting for the carriage to return to its initial position.

Other palletizers in the art are known for providing a more continuous flow of articles. U.S. Pat. No. 3,934,713 to Van der Meer et al. discloses a conveyor 42, sweep assembly 46, and passage inhibiting assembly 50 which cooperate to begin the conveyance of a second group of containers from receiving station 52 to sweep station 48 while the sweep assembly is positioning itself for a new group, whereby the overall time required for receiving containers and transferring layers thereof to pallet 14 is reduced. However, this device has the disadvantage that timing is particularly critical, as the sweep moves to push articles onto the pallet and articles are received on a pattern former behind the sweep attached to a common endless chain. If proper chain timing is not achieved, articles being transferred onto the pallet may be tipped over, while articles moving in behind may impact the pattern former in an unstable manner.

Other palletizers are shown for example in U.S. Pat. No. 3,389,6,810 to Wolfe et al. and U.S. States Pat. No. 3,027,020 to McCoy.

III. SUMMARY OF THE PRESENT INVENTION

In accordance with a preferred embodiment of the present invention, an improved palletizer is provided wherein a pattern forming stop means placed in the article path of travel is made separate from the carriage, rather than fixedly attached thereto. This stop means is retractable from the article group path. This pattern forming stop means comprises a set of staggered pins that are extendable perpendicularly into the article path for pattern forming, but retractable during the carriage's forward sweeping action. After the carriage has swept an article group over the retracted pattern forming pins, but before the carriage has returned to its initial position, the pattern forming pins are raised into the article path for receiving a next subsequent group of articles while the carriage is returning to its initial position, thereby saving time.

It is an object of the present invention to provide an improved apparatus and method for palletizing articles.

It is a further object of the present invention to provide an improved apparatus and method for palletizing articles wherein the total cycle time is reduced, thereby increasing machine speed.

Further objects and advantages of the present invention will become apparent from the following description of the drawings and the preferred embodiments.

IV. BRIEF DESCRIPTION OF THE DRAWINGS

V. DETAILED DESCRIPTION OF THE PREFERRED EMBODIMENT

Figure 1:
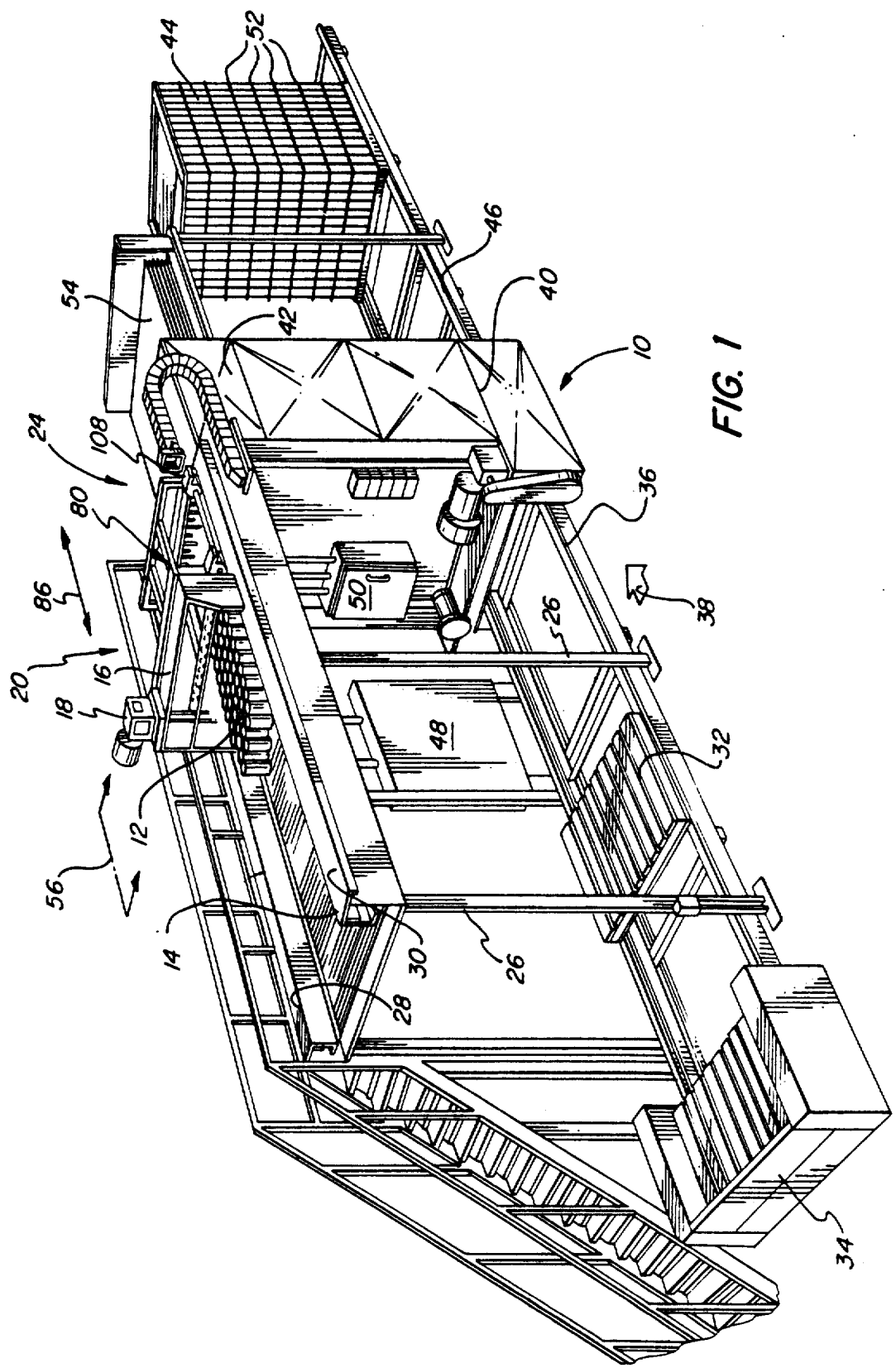
FIG. 1 is a perspective view of the improved palletizer of the present invention.

With reference now to FIG. 1, the improved palletizer of the present invention is shown generally at 10. Randomly supplied articles 12 such as bottles, cans, or other containers either full or empty, are received on accumulation bed 14, which is typically a standard endless conveyor surface routinely coupled to a source of articles not here shown. Gating means 16 such as holding pins operated by suitable conventional actuator 18 gates or controls the flow of articles further downstream to pattern forming area 20. After pattern forming at area 20, a group such as a formed layer of articles is swept by carriage 80 onto the pallet loading area 24.

While the present invention relates more specifically to the details of the carriage movement and pattern forming operation, the remaining well known structure of palletizer 10 is here briefly described for sake of completeness. Conventional structural members 26 provide a suitable base for palletizer 10. Guide rails 28 and 30 provide side-to-side guidance control for articles 12. Pallets such as at 32 are transported from a supply 34 thereof along a track 36 in direction of arrow 38, which also defines machine direction, to hoist 40 for raising the pallet upwardly to a level indicated generally at 42 to receive layered articles as described above. As shown at 44, the loaded pallets are moved from the hoist area along track 46 for further processing, such as retrieval by a fork lift operator. Electrical and control panels 48 and 50 provide palletizer power and control. Separator sheets, such as chipboard indicated at 52, are for separating adjacent article layers. Such separator sheets are picked up one at a time from a supply or stack 54 thereof and interleaved between adjacent layers on the pallet in said hoist area in a routine way that forms no part of the present invention.

Figure 2:
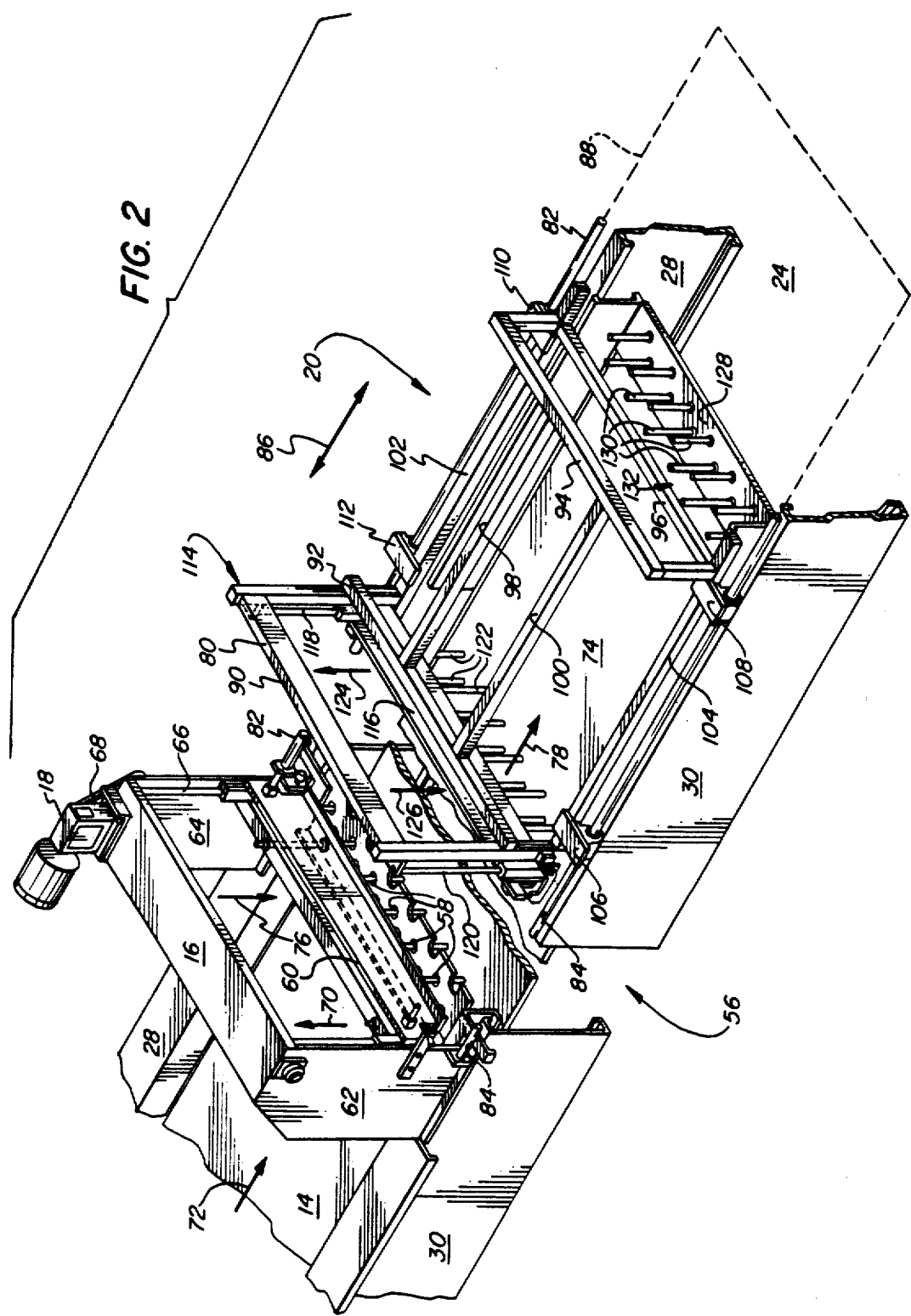
FIG. 2 is an isometric view of one portion of the improved palletizer of the present invention, with a sectional cut and breakaway to further detail the structure.

Turning now to FIG. 2, a more detailed view of the structure of the present invention is provided. A view 56 indicated generally in FIG. 1 is illustrated with a section taken through the middle and pulled apart to show further details of the present invention. Gate 16 includes downwardly extending holding pins 58 for being raised and lowered by standard control means 18 in cooperation with suitable cross support members 60, vertical supports 62 and 64, vertical travel rods 66, and suitable routine mechanical linkage 68. When pins 58 are raised in direction of arrow 70 by a distance greater than the height of the articles, articles being impelled downstream in direction of arrow 72 by endless conveyor surface 14 may pass to the pattern forming section indicated generally at 74. When pins 58 are lowered in the direction of arrow 76 to approach conveyor surface 14 (also known as the tin line 14), the article path of travel indicated generally by arrow 78 is temporarily shut off and articles accumulate upstream of gate 16. It will further be seen in FIGS. 6-6C below that pins 58 are staggered or offset with respect to each other to assist in preforming the pattern that will be finally formed at area 74.

Carriage 80 is mounted on longitudinally extending rods 82 and 84 for travelling back and forth in a cyclical manner indicated by double headed arrow 86 to sweep a layer or group of articles formed at area 74 to the pallet loading area 24 indicated here only generally by dotted lines 88. Carriage 80 can be of any reasonable construction, which here includes cross structural members 90, 92, 94, and 96 suitably joined to lengthwise structural members 98, 100, 102, and 104. Appropriate sliding bearing means 106, 108, 110, and 112 mount carriage 80 for sliding back and forth. The prime mover, such as an electrical or pneumatic motor means, is not shown in FIG. 2, but it is understood that such a source of reciprocating motion provides the carriage sweeping action.

Carriage 80 also has at an upstream end 114 thereof a sweeping means such as gate 116 that can be raised or lowered on vertically disposed guide rods 118 and 120. Staggered downwardly depending pins 122, which are staggered in matching format to the retractable pattern forming stop to be described below, are raised in direction of arrow 124 to receive a new charge of articles and are lowered in the direction of arrow 126 to engage the last or upstream-most transverse row of articles in a group, so that when carriage 80 is moved downstream the group is pushed or swept along by pins 122 onto the pallet loading area 20. It is understood that pins 122 are raisable or lowerable by conventional control means not shown in FIG. 2.

The retractable pattern forming stop of the present invention is indicated generally at 128, which comprises staggered pins 130 adjacent a downstream end 132 of pattern forming area 74 and carriage 80 when in the initial or home position as shown in FIG. 2.

Figure 3:
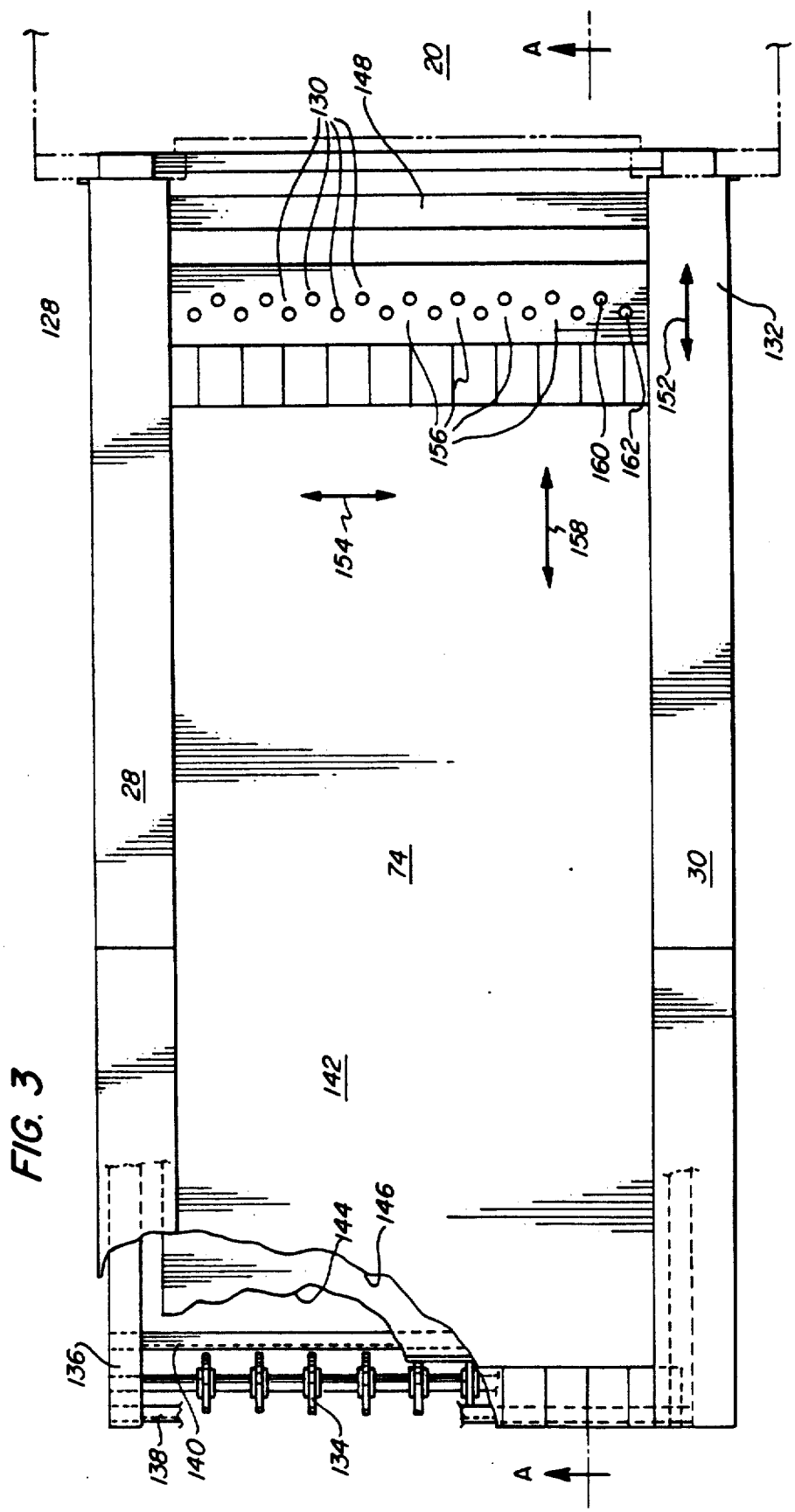
FIG. 3 is a top view of the pattern forming area of the improved palletizer of the present invention.

FIG. 3 is a top view of the pattern forming area 74 with carriage 80 removed to permit the retractable pin pattern to be shown. Also indicated are routine wheel means 134 mounted with conventional structural means 136, 138, and 140. Guide rail 28 and the support surface 142 for the pattern forming area 74 are cut away as shown at 144 and 146 to reveal such detail. Likewise, routine structural members are indicated generally at 148 downstream of area 74.

As can be seen from FIG. 3, pattern forming pins such as at 130 are staggered from each other in a longitudinal direction indicated by arrow 152 to form pattern forming pockets- across a cross machine direction indicated by arrow 154 such as at 156 for receiving articles therein in a nested fashion as articles are urged thereagainst in direction of arrow 158 by machine line pressure when gate 16 is open. This action is shown in further detail in FIG. 6 below. The amount by which each downstream most set of pins such as pin 160 is offset from the upstream most set of pins such as pin 162 is routinely chosen to provide the selected pattern, and the cross machine distance between adjacent pins is also routinely chosen.

Figure 4:
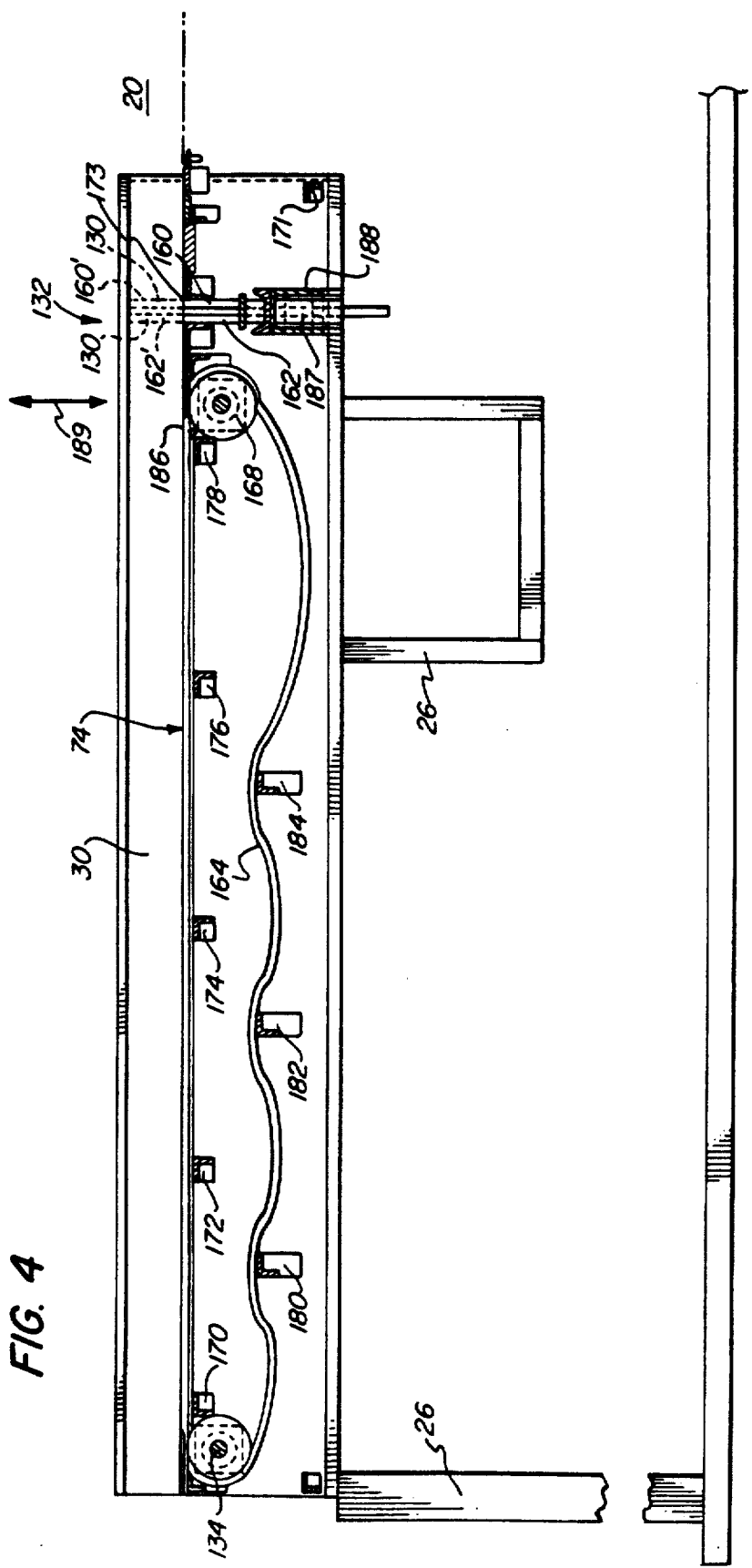
FIG. 4 is a side view of the pattern forming area of FIG. 3 with a cross-section taken along A—A.

The side view of FIG. 4 taken along line A—A shows endless belt or chain 164 mounted around wheels 134 and 168 with additional conventional structural members 170, 171 172, 173, 174, 176, 178, 180, 182, and 184. Retractable pattern forming pins 130 move back and forth in a perpendicular direction as indicated by double-headed arrow 189 along conventional mounting and guide means indicated generally at 187 under control of a conventional air cylinder 188. Pins such as 160 and 162 move from a retracted position shown in FIG. 4 to an extended position indicated in phantom at 160' and 162' above tin line 186 through appropriately sized and spaced apertures in floor 173.

Figure 5:
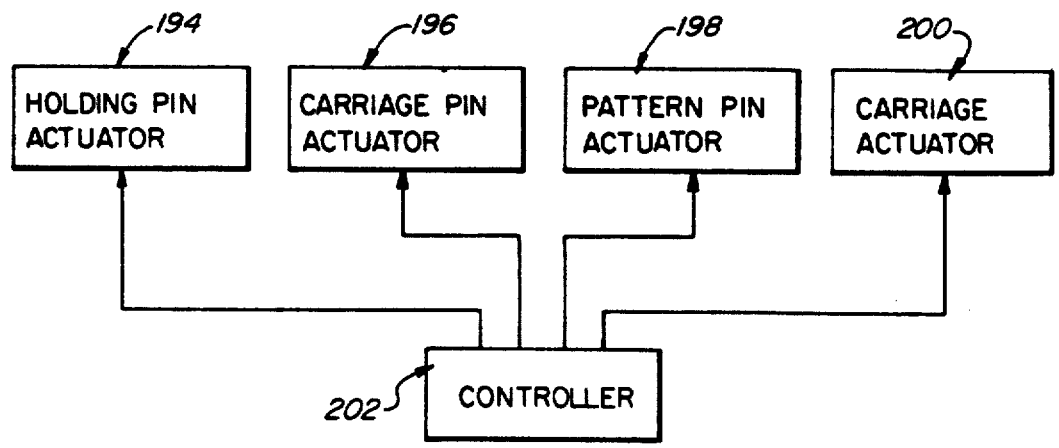
FIG. 5 is a block diagram illustrating one control system for the present invention.

FIG. 5 is a schematic block diagram illustrating the control system, which is accomplished in a conventional manner with standard elements well known in the art, which can be for example either electrical or pneumatic or a combination of both. Holding pin actuator 194 such as for example motor 18, carriage pin actuator 196, pattern pin actuator 198 such as for example motor 188, and carriage actuator 200 are all controlled by controller 202 to carry out the method of the present invention further described below. Controller 202 can be any suitable control means, such as for example a programmable logic controller or even a human operator manipulating an array of control switches.

Figure 6:
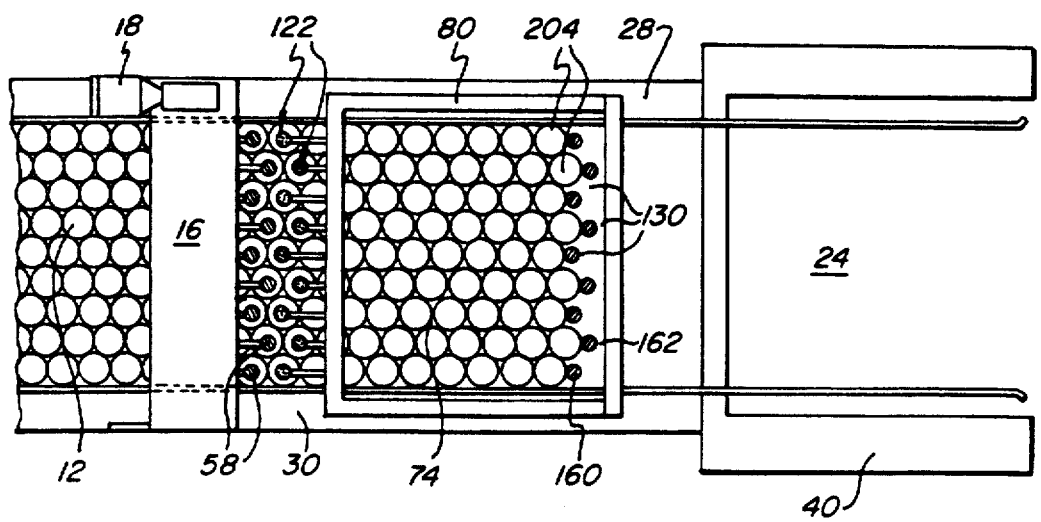
FIGS. 6, 6A, 6B, and 6C are schematic top and side views further illustrating the method of the present invention.

The method steps of the present invention are now explained with respect to FIG. 6. FIG. 6 is a top view of FIG. 6A, while FIGS. 6B and 6C are side views of further steps of the present method.

Figure 6A:
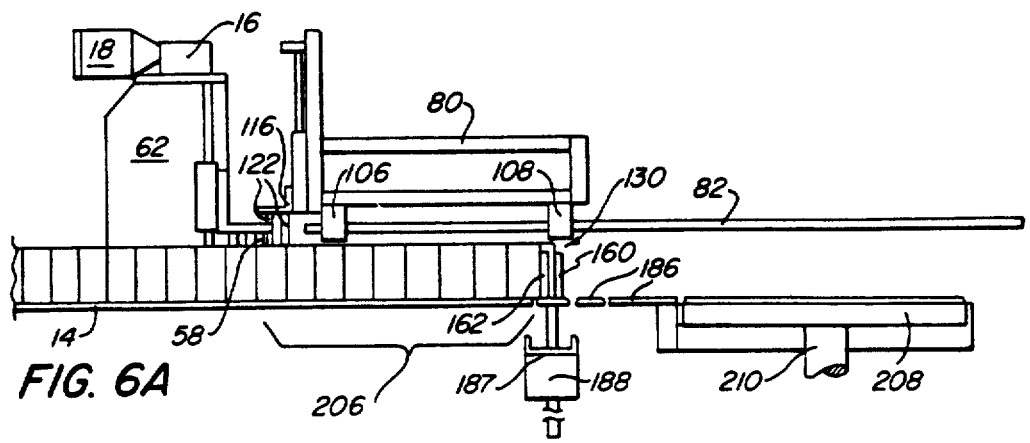

In the top view of FIG. 6 and the matching side view of FIG. 6A, carriage 80 is in its initial or home position, the supply of containers at 12 has already been admitted under normal line pressure to pattern forming area 74, and the front transverse row 204 of containers has been urged into a nested relationship with staggered pins 130 such as pins 160 and 162 to form a well known packed pattern known in the art to be a relatively efficient use of pallet space. As seen in FIG. 6A, gate 16 preferably comprising holding pins 58 is in the engaged or down position under influence of actuator 194 and controller 202 for shutting off the flow of articles, whereas sweeping means 116 preferably comprising the carriage pins 122 is also in the engaged or down position under influence of actuator 196 and controller 202 (see FIG. 5). The particular embodiment shown in FIG. 6 uses empty containers such as beverage cans with an open top, and the holding and carriage pins actually extend downwardly into the open containers. It is understood that other conventional arrangements are readily known in the art. Also, it is known in some prior art embodiments to have a reject row in between the holding and carriage pins, which is disposed of in a cross machine direction.

Carriage pins 122 and holding pins 58 are preferably in a staggered relationship matching that of pattern pins 130, as is readily seen in FIG. 6. This is to facilitate pattern forming and to preserve the pattern after pattern pins have retracted to permit the sweeping operation.

Figure 6B:
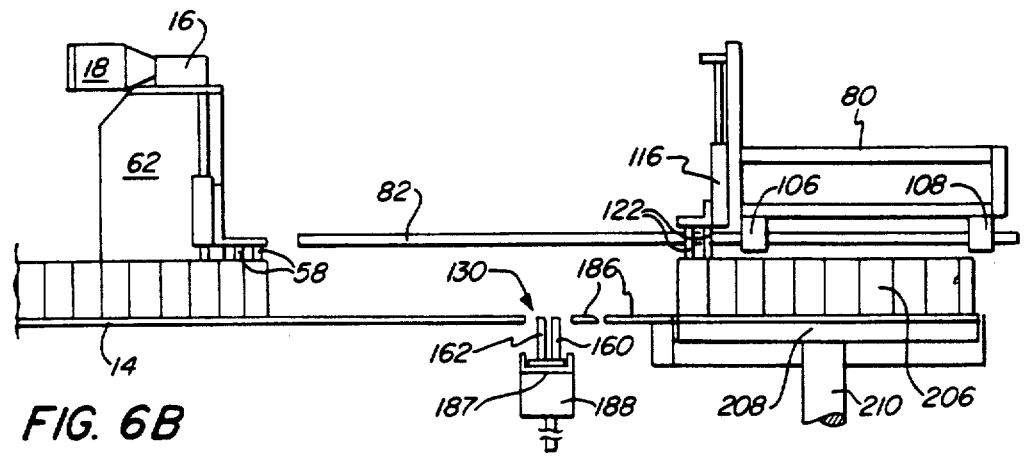
Figure 6C:
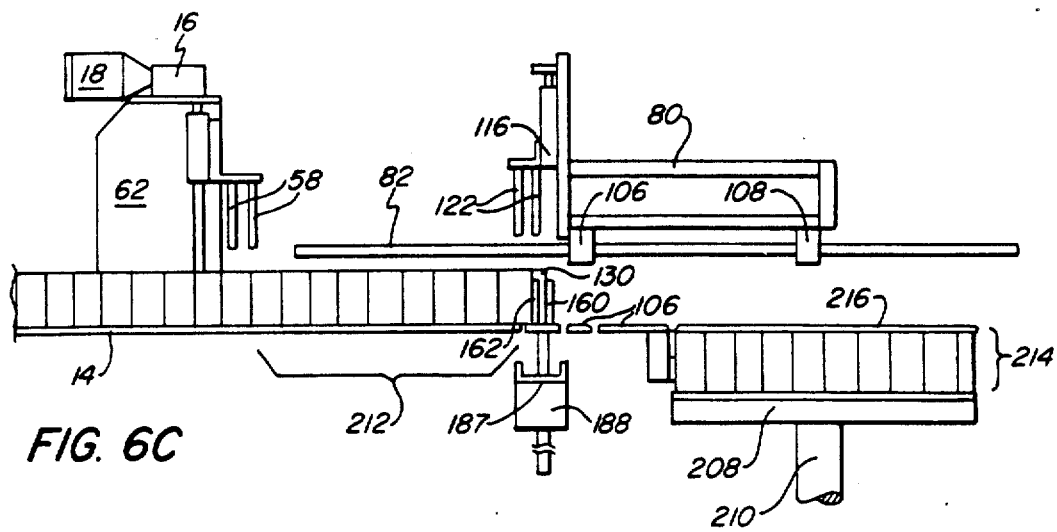

In FIG. 6B, pattern pins 130 are retracted below tin line 186 to permit the sweeping action of carriage 80 to transport layer or group 206 to be swept onto the pallet 208 conventionally positioned on hoist member 210. It is to be noted that carriage pins 122 are maintained in the down or engaged position during the sweeping step.

FIG. 6C illustrates the carriage 80 as it is returning to its initial position. Carriage pins 122 are up or disengaged to clear the top of the next subsequent group 212, and holding pins 58 are also up to permit group 212 to be urged downstream by line pressure against pattern pins 130, which are now extended upwardly for providing a pattern forming stop for temporarily arresting the forward travel of group 212.

Once carriage 80 has returned to its initial position, the cycle is repeated.

It is noted that hoist member 210 and pallet 208 have been decremented downwardly by a distance corresponding to the height 214 of one layer of containers, and a separator sheet 216 has been positioned thereacross for receiving the next subsequent group 212.

It can readily be appreciated, especially from FIG. 6C, that the apparatus and method of the present invention represent a simple way of achieving a time savings over prior art carriage-type devices by permitting introduction of the next subsequent container group while the carriage is returning to its initial position.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. An apparatus for forming patterned group of articles supplied by a conveyor along a path, comprising:
   a staggered row of pattern forming pins positioned transverse to the path, and upwardly extendable into the path to temporarily arrest downstream motion of the articles, said staggered row of pattern forming pins offset from each other in an alternating fashion by a preselected distance in a direction along said path to form a series of pattern forming pockets to receive a downstream-most transverse row of articles in a nested relationship to form the pattern when said staggered row of pattern forming pins are in a raised position into the path;
   means for moving said staggered row of pattern forming pins between the raised position and a retracted position beneath the path;
   a staggered row of holding pins positioned transverse to the path and upstream of said staggered row of pattern forming pins, and extendable into the path to temporarily arrest downstream motion of the articles to define a group of articles, between said staggered rows, said staggered row of holding pins offset from each other in an alternating fashion by a preselected distance in a direction along said path to form a series of pattern forming pockets matching those of said staggered row of pattern forming pins to receive articles supplied by the conveyor in a nested relationship to preform the pattern when said staggered row of holding pins are in an extended position into the path; and
   means for sweeping a pattern formed group of articles downstream along the path from an initial position between said holding pins and said pattern forming pins, over said staggered row of pattern forming pins in the retracted position, to a final position downstream of said staggered row of pattern forming pins, said sweeping means comprising
   a carriage for travelling back and forth in a cyclical manner to deliver groups of articles from the initial position to the final position; and
   a staggered row of carriage pins mounted to said carriage, and positioned transverse to the path and downstream of said staggered row of holding pins, and extendable into the path to engage an upstream-most row of articles int he pattern formed group on an inside surface thereof for sweeping the pattern formed group downstream, and staggered row of carriage pins offset from each other in an alternating fashion by a preselected distance in a direction along said path to form a series of pattern forming pockets matching those of said staggered row of pattern forming pins to preserve the pattern as a pattern formed group is swept downstream.

2. The apparatus of claim 1 including means for moving said staggered row of holding pins between a withdrawn position out of the path permitting pattern preformed articles to move downstream toward said pattern forming pins and the extended position delineating a group of articles.

3. The apparatus of claim 2 wherein said means for moving said holding pins comprises means for lifting said holding pins from the extending position to the withdrawn position, and means for lowering said holding pins from the withdrawn position to the extended position.

4. The apparatus of claim 1 wherein said holding pins engage the articles on an inside surface thereof.

5. The apparatus of claim 1 comprising means for moving said carriage between the initial position and the final position, including means for lifting said carriage pins out of engagement with the articles.

6. A palletizer for forming patterned groups of articles supplied by a conveyor along a path, and for loading the pattern formed groups onto a pallet at a loading area, comprising:

a row of pattern forming pins positioned transverse to the path, and upwardly extendable into the path to temporarily arrest downstream motion of the articles, said row of pattern forming pins form a series of pattern forming pockets to receive a downstream-most transverse row of articles in a nested relationship to form the pattern when said row of pattern forming pins are in a raised position into the path;

means for moving said row of pattern forming pins between the raised position and a retracted position beneath the path;

a row of holding pins positioned transverse to the path and upstream of said row of pattern forming pins, and extendable into the path to temporarily arrest downstream motion of the articles by engaging the articles on an inside surface thereof to define a group of articles between said rows, said row of holding pins matching said row of pattern forming pins to receive articles supplied by the conveyor in a nested relationship to preform the pattern when said row of holding pins are in an extended position into the path;

a row of carriage pins positioned transverse to the path and in an initial position downstream of said row of holding pins, and extendable into the path to engage an upstream-most row of articles in the pattern formed group on an inside surface thereof for sweeping the pattern formed group downstream to a final position at the loading area, said row of carriage pins matching said row of pattern forming pins to preserve the pattern as a pattern formed group is swept downstream; and means form moving said row of carriage pins from the initial position over said pattern forming pins in the retracted position to the final position to load pattern formed groups of articles onto the pallet, and for moving said row of carriage pins from the final position back to the initial position in a cyclical manner.

7. The palletizer of claim 6 wherein said carriage pins and said holding pins and said pattern forming pins are offset from each other within their respective rows in an alternating fashion by a preselected distance in a direction along said path such that said pins form staggered rows.

8. The palletizer of claim 6 comprising means for moving said row of holding pins between the extended position and a withdrawn position out of the path.

9. The palletizer of claim 6 comprising means for lifting said row of carriage pins clear of incoming articles as said carriage pins are moving from the final position back toward the initial position.

10. A palletizer for forming patterned groups of articles supplied by a conveyor along a path, and for loading the pattern formed groups onto a pallet at a loading area, comprising:

a row of pattern forming pins positioned transverse to the path, and upwardly extendable into the path to temporarily arrest downstream motion of the articles, said row of pattern forming pins form a series of pattern forming pockets to receive a downstream-most transverse row of articles in a nested relationship to form the pattern when said row of pattern forming pins are in a raised position into the path;

means for moving said row of pattern forming pins between the raised position and a retracted position beneath the path;

a row of holding pins positioned transverse to the path and upstream of said row of pattern forming pins, and extendable into the path to temporarily arrest downstream motion of the articles defining a group of articles between said rows, said row of holding pins to receive articles supplied by the conveyor in a nested relationship to preform the pattern when said row of holding pins are in an extended position into the path;

means positioned in an initial position downstream of said row of holding pins, and extendable into the path to engage a rearward-most row of articles in the pattern formed group for sweeping the pattern formed group downstream to a final position at the loading area while preserving the pattern, said sweeping means comprising a row of carriage pins and wherein said row of carriage pins matches both said row of holding pins and said row of pattern forming pins; and means for moving said sweeping means from the initial position over said pattern forming pins in the retracted position to the final position to load pattern formed groups of articles onto the pallet, and for moving said row of carriage pins from the final position back to the initial position in a cyclical manner.

11. The palletizer of claim 10 wherein said carriage pins and said holding pins and said pattern forming pins are offset from each other within their respective rows in an alternating fashion by a preselected distance in a direction along said path such that said pins form staggered rows.

12. The palletizer of claim 10 comprising means for lifting said row of carriage pins clear of incoming articles as said carriage pins are moving from the final position back toward the initial position.

13. The palletizer of claim 10 wherein said carriage pins engage the rearward-most row of articles in the pattern formed group on an inside surface thereof.

14. The palletizer of claim 10 wherein said row of carriage pins is positioned transverse to said path.

15. The palletizer of claim 10 wherein said holding pins engage articles on an inside surface thereof.

16. The palletizer of claim 10 comprising means for moving said row of holding pins between the extended position and a withdrawn position out of the path.

17. The palletizer of claim 10 wherein said row of holding pins matches said row of pattern forming pins.

18. The palletizer of claim 10 wherein said sweeping means sweeps pattern formed groups downstream in a direction along said path.

* * * * *